Patented Nov. 7, 1950

2,529,236

UNITED STATES PATENT OFFICE 2,529,236

REACTIVATION OF COBALT OXO CATALYST

Marius 't Hart, Han Hoog, and Krijn Arnout Weeda, Amsterdam, Netherlands, assignors to Shell Development Company, San Francisco, Calif., a corporation of Delaware No Drawing. Application May 1, 1948, Serial No. 24,667. In the Netherlands May 2, 1947

3 Claims. (Cl. 252—416)

This invention relates to a method for the reactivation of cobalt catalyst for use in the carbonylation of organic compounds by the Oxo Process.

The Oxo Process provides a method for the synthesis of various oxygenated compounds, including aldehydes, ketones, carbinols, acids and esters, by the catalyzed addition of carbon monoxide and hydrogen to the unsaturated bonds of various unsaturated organic compounds which may be considered the parent compounds of the oxygenated compounds produced. The parent compounds are usually compounds such as hydrocarbons, alcohols, aldehydes, ketones, acids, ethers, and esters having one or more ethylenic or acetylenic linkages; however, the process is not limited to the synthesis of oxygenated derivatives from such compounds since certain compounds having an unsaturated nature but no true double bond can also be carbonylated. Materials of this latter class are, for example, the dialkyl formals, acetals containing aromatic or cycloaliphatic groups, cyclic acetals such as 1,3-dioxalane and aliphatic cyclic ethers.

In the Oxo Process the carbonylation is carried out by treating the parent compound to be carbonylated with a mixture of carbon monoxide and hydrogen in the presence of a suitable solid catalyst. The carbonylation is carried out at a temperature which is usually between about 100° C. and 200° C. and under a pressure above about 50 atmospheres, e. g., 150–350 atmospheres. For further particulars regarding the Oxo Process and its applications reference is given to the Petroleum Refiner 25, 503–4 (1946), National Petroleum News, issue of November 7, 1945, page R926–30 and the following United States patents: 2,429,878, 2,402,133, 2,327,066, 2,003,477, 1,973,662.

The preferred catalyst for the Oxo Process is cobalt. Thus, the usual cobalt Fischer-Tropsch catalyst is quite suitable and is commonly used. This catalyst is prepared under carefully controlled conditions as described in The National Petroleum News, issue of November 7, 1945, page R922–24. In the Fischer-Tropsch Process for the synthesis of hydrocarbons, it is very important that the cobalt be combined in a very specific way with a selected kieselguhr. For use in the Oxo Process, on the other hand, it is not necessary to follow this particular method of catalyst preparation nor to employ a selected kieselguhr. Thus, any of the common catalyst carrier materials may be employed, or the carrier material may be omitted.

In one method for carrying out the Oxo Process the catalyst in a finely divided condition is suspended as a slurry in the liquid reaction mixture. In another method the catalyst is disposed as a fixed bed in the reactor. In this latter method it is the practice to continuously or continually add a small amount of a suitable cobalt compound to the feed to the reactor. Suitable cobalt compounds are, for example, soluble cobalt salts of fatty acids and cobalt carbonyl.

When carrying out the Fischer-Tropsch Process with this catalyst, the activity of the catalyst gradually declines during use. In this process the loss of activity is due primarily to the deposition of wax on the catalyst and to some extent also to poisoning by traces of sulfur compounds. The catalytic activity can be restored to an appreciable extent by treating the catalyst with a solvent for the wax, or by drastic hydrogenation to remove the wax, or by a combination of these treatments, but as pointed out in the cited article and in United States Patents Nos. 2,238,726, and 2,289,731, these methods are only partially effective in removing the wax and the catalyst must be replaced after a comparatively short time. The spent catalyst is then reworked to remove the active parts (e. g., metals and metal oxides) by dissolving them, e. g., in nitric acid, filtering, reprecipitating the active parts, e. g., by carbonate of alkali, drying the precipitate, and so on.

The catalyst also declines in efficiency when used in the Oxo Process. However, the catalytic action here, although incompletely understood, is entirely different and the cause of the decline in the activity is not known. There is no wax or other carbonaceous matter deposited upon the catalyst, and the catalytic action is not appreciably affected by the presence of sulfur compounds. Also, the known treatment with hydrogen does not effect reactivation even if the catalyst (which is quite pyrophoric) is superficially oxidized by exposing it to oxygen prior to the hydrogenation treatment (which superficial oxidation sometimes has a small beneficial effect when hydrogenating off the wax from catalyst deactivated by use in the Fischer-Tropsch Process).

We have now found that cobalt catalyst which has become partially deactivated through use in the Oxo Process may be substantially completely reactivated for use in this process by first subjecting it to a very high temperature oxidation treatment followed by a high temperature reduction. Since the catalyst treated contains no appreciable amounts of carbonaceous deposits or sulfur it is believed that this reactivation treatment is effective through alteration of the nature of the surface of the catalyst rather than through the removal of any poisons. This treatment, it may be noted, is ineffective in restoring the activity of the same catalyst for use in the Fischer-Tropsch synthesis of hydrocarbons.

In reactivating spent cobalt catalyst deactivated through use in the production of oxygenated compounds by the Oxo Process we first subject the spent or partially spent catalyst to a high temperature treatment in an oxidizing atmosphere, e. g., air. This treatment is carried out at a temperature of at least 700° C. (1292° F.) and preferably between about 700° C. and 900° C. It is not important that the treatment at such temperatures be carried out for any extended length of time. Thus, the time required to bring the catalyst up to these high temperatures is usually sufficient. Longer times of heating may, however, be employed. After subjecting the catalyst to this high temperature oxidation treatment, it is then re-reduced with hydrogen or any other reducing gas at a temperature of 400° C. or above, e. g., 475° C.

The process according to the invention will be explained more in detail with reference to a specific example.

Example

Over a pumice stone catalyst containing about 3% by weight of cobalt, olefines and water gas were passed under a pressure of 200 atmospheres and at a temperature of 140–180° C., as a result of which chiefly aldehydes were formed. This was an application of the conventional Oxo Process.

To the initial parent material (a fraction consisting largely of $C_5$—$C_8$ olefines) cobalt was added in the form of salts of $C_6$—$C_9$ fatty acids, prepared from the $C_6$—$C_9$ alehydes by oxidation, the quantity varying between 0.15 and 0.25% by weight of cobalt to the olefinic initial material. After about 700 hours the aldehyde content of the product, which originally amounted to 65% by weight, decreased to 25–30% by weight.

The catalyst was then subjected to a hydrogenation treatment in situ at a temperature of 475° C. and a pressure of 200 atmospheres. This effected only a partial reactivation. After this treatment the product contained about 55% aldehydes and this subsequently decreased to only 25% by weight. Further attempts to restore the activity by treatment with hydrogen were without success.

A portion of the catalyst was then subjected to a superficial oxidation and repeatedly treated with hydrogen, but this did not result in any improvement in the activity.

Another portion of the catalyst was heated in air for a few minutes at a temperature of 700° C.–900° C. and subsequently reduced with hydrogen under atmospheric pressure at 475° C.

This resulted in a complete reactivation of the catalyst. Thus, upon being applied in the original Oxo Process the product contained about 68% by weight of aldehyde, or about 3% more than the fresh catalyst.

Prior to the reactivation treatment the catalyst contained less than 0.5% of carbon and only a trace of sulfur which was so small that it could not be held responsible for the low activity of the catalyst. The fore-section of the catalyst bed was also found to contain a small amount of copper which had come from the inlet pipes; however, it is known that this copper is not detrimental to the activity of the catalyst and furthermore would not be removed by the described reactivation treatment.

We claim as our invention:

1. The process for the reactivation of cobalt catalyst which has been deactivated through use in the production of oxygenated compounds by the Oxo Process which comprises the steps of heating the said deactivated catalyst to a temperature between 700° C. and 900° C. in contact with oxygen and then reducing the catalyst with a reducing gas at a temperature above 400° C.

2. The process for the reactivation of cobalt catalyst which has been deactivated through use in the production of oxygenated compounds by the Oxo Process which comprises the steps of heating the said deactivated catalyst to a temperature between 700° C. and 900° C. in contact with oxygen and then reducing the catalyst with hydrogen at a temperature of about 475° C.

3. The process for the reactivation of cobalt catalyst which has been deactivated through use in the production of oxygenated compounds by the Oxo Process which comprises the step of heating the said deactivated catalyst to a temperature between about 700° C. and 900° C. in contact with air and then reducing the catalyst with hydrogen at a temperature above 400° C. and in the order of 475° C.

MARIUS 'T HART.
HAN HOOG.
KRIJN ARNOUT WEEDA.

REFERENCES CITED

The following references are of record in the file of this patent:

UNITED STATES PATENTS

| Number | Name | Date |
| --- | --- | --- |
| 1,238,137 | Hagemann | Aug. 28, 1917 |
| 1,306,871 | Vis | June 17, 1919 |
| 1,904,440 | Freyermuth et al. | Apr. 18, 1933 |
| 1,915,362 | Hanks et al. | June 27, 1933 |
| 2,118,829 | Storch | May 31, 1938 |
| 2,455,419 | Johnson | Dec. 7, 1948 |